United States Patent

Parquet

[11] 3,913,453
[45] Oct. 21, 1975

[54] HYDROSTATIC TRANSMISSION
[75] Inventor: Donald James Parquet, Burlington, Iowa
[73] Assignee: Deere & Company, Moline, Ill.
[22] Filed: Aug. 30, 1974
[21] Appl. No.: 502,173

[52] U.S. Cl. .................... 91/420; 91/421; 60/460; 60/493; 180/66 R
[51] Int. Cl.² ...................................... F15B 13/042
[58] Field of Search ........ 91/420, 421; 60/459, 460, 60/493; 180/66 R

[56] References Cited
UNITED STATES PATENTS

| | | | |
|---|---|---|---|
| 2,328,979 | 9/1943 | Herman et al. | 91/420 |
| 2,328,980 | 9/1943 | Herman et al. | 91/420 |
| 2,431,032 | 11/1947 | Ernst | 91/420 |
| 3,523,490 | 8/1970 | Bianchetta | 91/420 |

*Primary Examiner*—Edgar W. Geoghegan

[57] ABSTRACT

A hydrostatic drive system for a land vehicle includes a fluid pump, a fluid reservoir, a pair of fluid motors connected to drive wheels of the vehicle, a supply line connected between the pump and motors, a return line connected between the reservoir and motors, and a retarder valve movable between open and closed positions and biased toward the closed position interposed in the return line. The retarder valve includes a servo chamber responsive to fluid pressure therein to move the retarder valve to its open position. First and second fluid passage means establish communication between the servo chamber and the supply and return lines, respectively. An additional valve means movable between open and closed positions and biased toward the closed position is interposed in the second fluid passage means and is responsive to a predetermined pressure in the return line to move to its open position. The retarder valve provides a braking effect if the motors are driven mechanically and begin to function as pumps, for example, when the vehicle is going down an incline at a speed greater than the capacity of the drive system, and the second fluid passage means and the valve therein prevents the retarder valve from completely closing and locking the wheels as long as the system is in operation.

3 Claims, 2 Drawing Figures

HYDROSTATIC TRANSMISSION

BACKGROUND OF THE INVENTION

The present invention relates generally to hydrostatic transmissions drive systems, and more specifically relates to such a transmission or drive system with an improved retarder system to limit overrunning of the transmission and provide a braking effect.

With a land vehicle having a mechanical transmission where there is a positive connection between the vehicle engine and drive wheels, the vehicle engine can be used to brake the vehicle to retard its movement. This is a desirable feature when it is desired to decelerate the vehicle or when it is desired to brake the vehicle while traveling down an incline, etc. When the engine is not running the mechanical connection also makes it possible to use the load of the engine to hold the vehicle in a stationary position. The braking or retarding feature is not available in a vehicle with a simple hydrostatic transmission since, if the vehicle wheels are driven mechanically, for example, when the vehicle rolls down an incline, the wheel motors simply function as pumps and their output is directed to a low pressure source.

Attempts have been made to provide hydrostatic transmissions with braking or retarder feature available with mechanical transmissions by utilizing retarding valves which create a resistance to fluid flow in the return lines so that when the motors are driven mechanically and function as pumps they have to overcome such resistance. However, all such retarding systems have had one or more of the following disadvantages: (1) the hydrostatic transmission would have to overcome the resistance to flow in the return line during normal operation; (2) the retarder valve could, under certain operating conditions, completely close and lock the drive motors; and (3) the retarder valve could not be completely closed to lock the drive motors and function as a parking brake.

SUMMARY OF THE INVENTION

The present invention has for its object to provide a retarder valve system for hydrostatic transmission which provides no resistance to return oil flow during normal operation and which, during periods when the drive motors function as pumps and the pressure in the supply line drops, resist fluid flow through the return line to provide a braking effect without locking the drive motors.

The above object is accomplished by providing a retarder valve in the return line which is normally held open by fluid pressure in the transmission supply line, which moves towards its closed position when the fluid pressure in the supply line drops below a predetermined value, and which, as it approaches its closed position is responsive to fluid pressure in the return line to maintain its partially closed position.

The above object and additional objects of the present invention will become apparent to those skilled in the art by a reading of the following description when taken in conjunction with the accompanying drawing.

DESCRIPTION OF THE PREFERRED EMBODIMENTS

Figure 1:
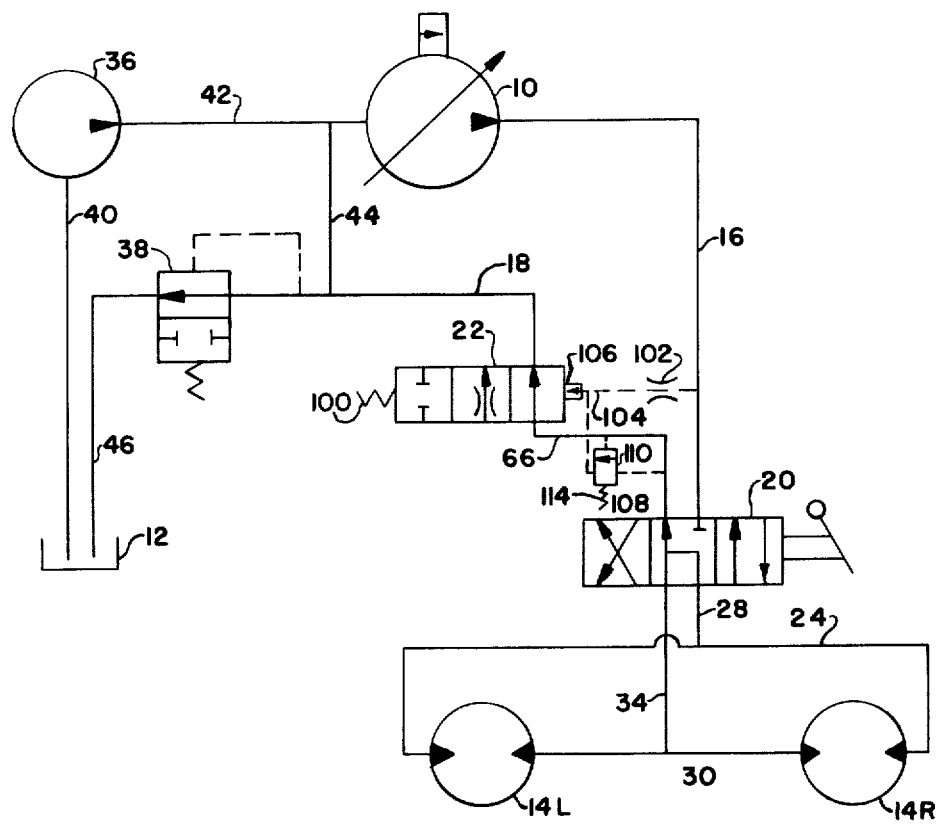
FIG. 1 is a schematic illustration of a hydrostatic transmission in which the retarder system according to the present invention has been incorporated.

Referring to FIG. 1, the basic components of the hydrostatic transmission include a substantially constant pressure variable volume pump 10, a fluid reservoir 12, a pair of hydraulic motors 14L and 14R which are drivingly connected to the drive wheels of a land vehicle, a fluid supply line 16, a fluid return line 18, a directional flow control valve 20 and a retarder valve 22. The normal inlet ports of the motors 14 are connected in parallel by fluid line 24 which in turn is connected to a port 26 in the directional flow control valve 20 by a fluid line 28. The normal outlet ports of the motors 14 are connected in parallel by a fluid line 30 which in turn is connected to a port 32 in the directional flow control valve 20 by a fluid line 34.

The hydrostatic transmission also includes a make-up pump 36 and a pressure relief valve 38. The make-up pump 36 draws hydraulic fluid from the reservoir 12 through a fluid line 40 and delivers the fluid to the pump 10 through a fluid line 42. The fluid line 42 is also connected to the return line 18 through a fluid line 44 so that oil returned through line 18 is also delivered to the pump 10. The pressure relief valve 38 drains fluid from the return line 18 to the reservoir 12 through a fluid line 46 so that excess pressure does not build up within the return line 18 and also assures that sufficient pressure is maintained in the line 42 to provide proper feeding of the pump 10.

Figure 2:
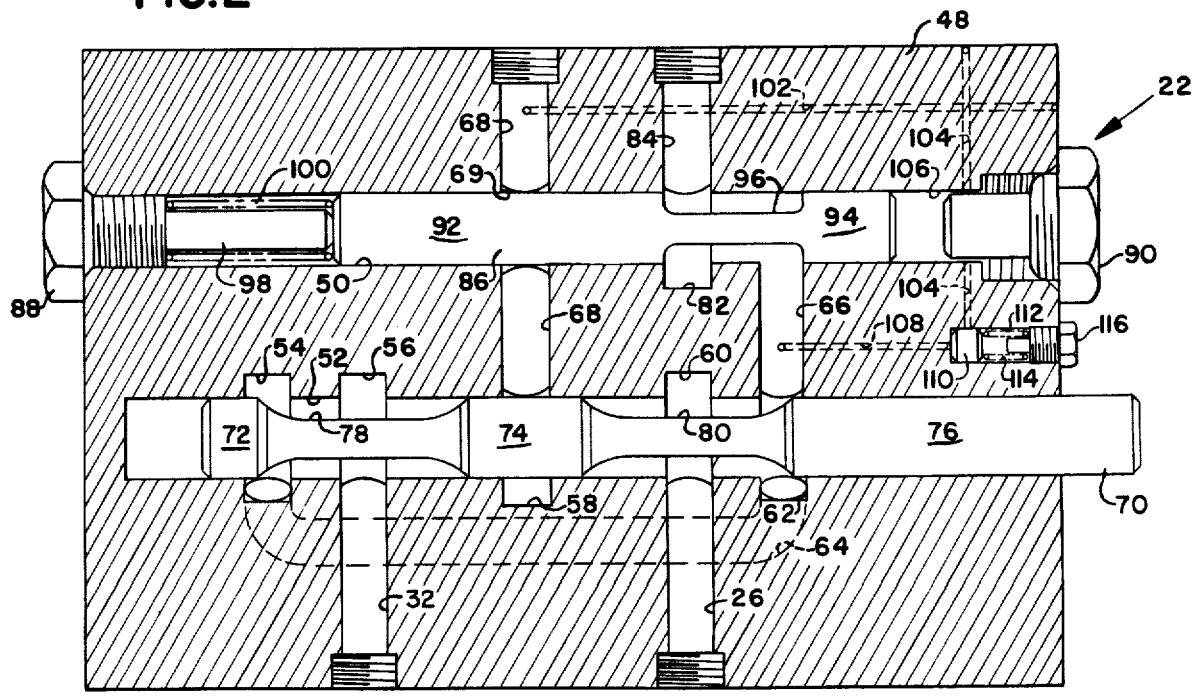
FIG. 2 is a sectional view through a directional flow control valve and retarder valve of the types schematically illustrated in FIG. 1.

The retarder valve 22 and directional flow control valve 20 are best illustrated in FIG. 2 and are shown as being formed with a common valve body 48 which has provided therein a retarder valve bore 50 and a directional flow control valve bore 52. The bore 52 is provided with five spaced annular grooves 54, 56, 58, 60 and 62. A passage 64 establishes constant communication between the grooves 54 and 62 and a passage 66 extends from the groove 62 to the retarder valve bore 50. The grooves 56 and 60 are in communication with the ports 32 and 26, respectively, and the annular groove 58 is in communication with a supply passage 68 which intersects the bore 50 through an annular groove 69 and is connected to the supply line 16.

A control spool 70 is slidably mounted in the bore 52 and is provided with three spaced lands 72, 74 and 76 which define spooling grooves 78 and 80 therebetween. The lands 72 and 74 are spaced apart a distance such that when the spool 70 is in a neutral position with the land 74 blocking communication between the bore grooves 56 and 58 and the bore grooves 60 and 58, the spooling groove 78 provides communication between the bore grooves 54 and 56 and the spooling groove 80 provides communication between the bore grooves 60 and 62. When the spool 70 is shifted to the right the land 72 blocks communication between the bore grooves 54 and 56, the spooling groove 78 provides communication between the bore grooves 56 and 58, and the spooling groove 80 provides communication between the bore grooves 60 and 62. When the spool 70 is shifted to the left the land 76 blocks communication between the bore grooves 60 and 62, the spooling groove 80 provides communication between the bore grooves 58 and 60, and the spooling grooves 78 provides communication between the bore grooves 54 and 56.

In addition to the bore groove 69, the retarder valve bore 50 is also provided with an annular groove 82 which is located between the groove 69 and the intersection between the bore 50 and the passage 66. A passage 84 extends from the groove 82 to the exterior of the valve body 48 and is connected to the return line 18. A valve spool 86 is slidably mounted in the bore 50, and the left and right ends of the bore 50 are closed by plugs 88 and 90, respectively. The spool 86 is provided with lands 92 and 94 at its opposite ends which define a spooling groove 96 therebetween. Land 92, in all positions of the spool 86, blocks communication between the bore groove 69 and the bore 50, and the spooling groove 96 is of sufficient length to establish free communication between the bore groove 82 and the passage 66 when the spool 86 is moved to its limit to the left. The movement of the spool 86 to the left is limited by a projection 98 on the plug 88. A spring 100 encircles the projection 98 and acts against the plug 88 and the left end of the spool 86 to bias the spool 86 to the right, closed position in which the land 92 blocks communication between the bore groove 82 and the passage 66. Movement of the spool 86 to the right is limited by engagement between the right end of the spool 86 and the plug 90. As will be hereinafter more fully explained, the right end of the bore 50 and the land 94 on the spool 86 define a servo chamber 106 with the land 94 further defining means responsive to fluid pressure therein to move the valve 86 to the left against the bias of the spring 90.

Fluid passages 102 and 104 form a pilot passage establishing communication between the port 68 and the servo chamber 106 so that the servo chamber 106 is in constant communication with the supply line 16. An additional pilot passage formed by a continuation of the passage 104 and a passage 108 extends between the passage 66 and the servo chamber 106. A pressure relief valve is interposed between the passages 104 and 108 and normally prevents fluid flow from the passage 66 to the servo chamber 106. The pressure relief valve includes a piston 110 slidably mounted in a bore 112 and normally biased to a closed position by a spring 114 which acts between the piston 110 and a plug 116.

During normal operation of the hydrostatic transmission, the pump 10 is driven by the vehicle engine to supply fluid pressure to the supply line 16. When the spool 70 of the directional flow control valve 20 is in its neutral position the fluid pressure in the supply line 16 is blocked from the motors 14, but passes through the passages 102 and 104 to servo chamber 106 so that pressure in the servo chamber 106 holds the spool 86 in its extreme open position. If the spool 70 of the directional flow control valve 20 is shifted to the left, fluid pressure in the supply line 16 flows to the motor inlet ports through the bore groove 58, the spooling groove 80, the bore groove 60, port 26 and fluid lines 28 and 24. Fluid from the outlet ports of the motors 14 flows through the fluid lines 30 and 34, port 32, bore groove 56, spooling groove 78, bore groove 54, passage 64, bore groove 62, passage 66, spooling groove 96, bore groove 82 and port 84 to the return line 18 from whence it is delivered either to the pump 10 through the line 44 or reservoir 12 through the pressure relief valve 38 and fluid line 46.

If the motors 14 should start to function as pumps, as would occur if the vehicle rolls down an incline at a rate faster than the vehicle would normally be driven by the hydrostatic transmission, the pressure in the supply line 16 would decrease causing a decrease of the pressure in the servo chamber 106. When the pressure within the servo chamber 106 decreases to where the force provided on the spool 86 by fluid pressure is less than the force provided on the spool 86 by the spring 100, the spool 86 will shift toward its closed position to throttle the flow of fluid from the spooling groove 96 to the bore groove 82. This throttling of fluid increases the pressure within the return line between the retarder valve 22 and the motors 14, which pressure serves as a load on the motors 14 to retard vehicle movement. As the pressure in the passage 66 of the return line increases a sufficient amount, the fluid pressure within the passage 108 acting against the piston 110 will overcome the force of the spring 114 so that fluid in the passage 108 is free to flow through the passage 104 to the servo chamber 106. The pressure within the servo chamber 106 prevents the spool 86 from moving to its completely closed position (to the right as viewed in FIG. 2) so that the wheel motors will not be locked. When the vehicle slows to a speed within the normal operation of the hydrostatic transmission the fluid pressure in the supply line 16 will increase, thus increasing the pressure within the servo chamber 106 so that the spool 86 is again moved to its fully open position as shown in FIG. 2.

The passage 102 is made sufficiently small so as to retard flow from the chamber 106 so that the flow of fluid from the passage 66 of the return line to the chamber 106 can provide the necessary pressure to prevent the spool 86 from completely closing.

If the spool 70 of the directional control valve 20 is moved to the right from its neutral position, the retarder valve 22 will function in exactly the same manner as above described, but the motor connections are reversed so that the normal inlet ports of the motors function as outlet ports and the normal outlet ports function as inlet ports.

When the vehicle engine is shut off so that the pump 10 is no longer operating, the pressure in the system will be reduced a sufficient amount so that the valve spool 86 can shift to its completely closed position, thus locking the motors 14 by preventing any return of fluid when the spool 70 of the directional flow control valve 20 is either in its forward or reverse position. If the spool 70 of the directional flow control valve 20 is in its neutral position when the vehicle engine is not running, the inlet and outlet ports of the motors 14 are interconnected through the directional flow control valve 20 so that the vehicle can be towed when necessary.

From the foregoing it can be seen that the present invention provides a retarder system for a hydrostatic transmission which provides a braking effect on the vehicle when the vehicle attempts to move faster than it would normally be driven by the transmission, which prevents the motors of the transmission from locking during operation, and which will lock the motors when the transmission is not in operation.

Having thus described a single preferred embodiment of the invention, various modifications within the spirit and scope of the invention will become apparent to those skilled in the art and can be made without departing from the underlying principles of the invention. Therefore, the invention should not be limited to the specific illustration and description, but only by the following claims.

I claim:

1. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means movable between open and closed positions and biased toward the closed position interposed in the return line means; pressure responsive means associated with the retarder valve means to move the same toward its open position in response to fluid pressure; first passage means establishing communication between the supply line means and pressure responsive means; second passage means establishing communication between the return line means and the pressure responsive means; valve means movable between open and closed positions and biased toward the closed position interposed in the second passage means; and means associated with the last mentioned valve means responsive to a predetermined pressure in the return line means to move the last mentioned valve means to its open position.

2. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means movable between open and closed positions interposed in the return line means; means biasing the retarder valve means toward the closed position; servo means associated with the retarder valve means responsive to fluid pressure to bias the retarder valve means toward its open position in opposition to the biasing means; first pilot passage means interconnecting the supply line means and the servo means; second pilot passage means interconnecting the return line means and the servo means; valve means movable between open and closed positions and biased toward its closed position interposed in the second pilot passage means; and means responsive to fluid pressure in the return line means biasing the valve means in the second pilot passage means to the open position.

3. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means interposed in the return line means including a valve body having a bore therein closed at both ends, a pair of ports connected to the return line and intersecting the bore at spaced locations; a spool slidably mounted in the bore and having lands at its opposide ends defining therebetween an annular grooved area of sufficient length to span the pair of ports and provide free communication therebetween; spring means acting between one closed end of the bore and one end of the spool biasing the spool toward a fluid blocking position in which the land on the one end of the spool blocks one of the pair of ports; the second closed end of the bore and the second end of the spool forming a servo chamber with movable means therein responsive to fluid pressure therein to move the spool against the bias of the spring toward a fluid passing position in which the grooved area spans the pair of ports; first pilot passage means interconnecting the supply line means and the servo chamber; second pilot passage means interconnecting the servo chamber and return line means between the retarder valve means and motor means; and valve means interposed in the second pilot passage means; the last mentioned valve means being biased toward a normally closed position and responsive to a predetermined fluid pressure in the return line means between the retarder valve means and the motor means to move to the open position.

* * * * *